J. M. GALLAGHER.
WINDOW ATTACHMENT.
APPLICATION FILED FEB. 24, 1917.
1,276,641.
Patented Aug. 20, 1918.
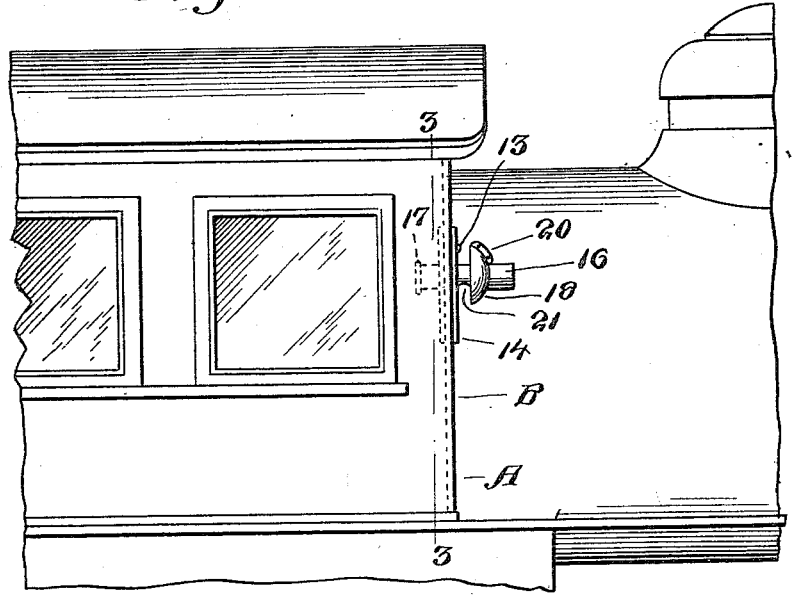
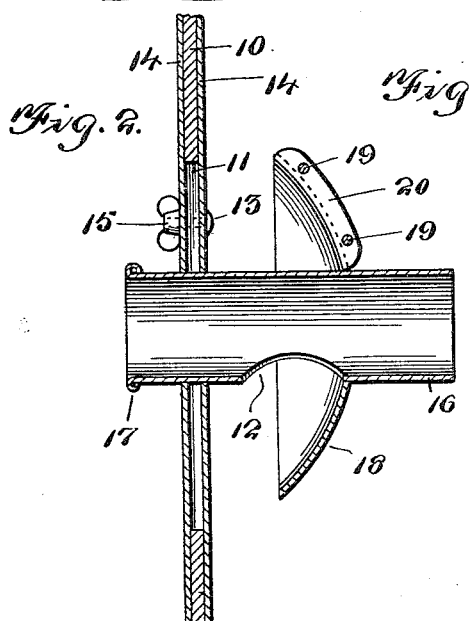
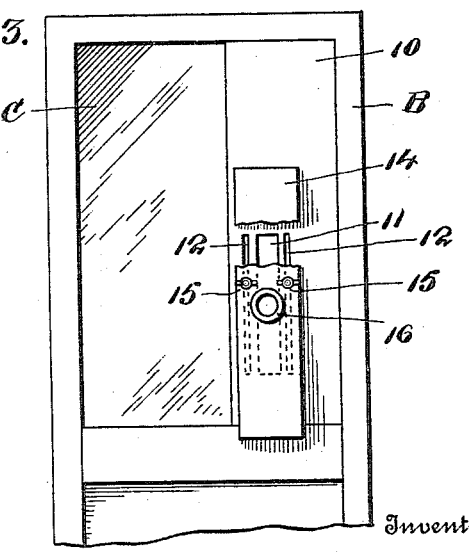
Inventor
Joseph M. Gallagher
By Talbert & Parker.
Attorney
Witnesses
E. R. Ruppert

UNITED STATES PATENT OFFICE.

JOSEPH M. GALLAGHER, OF RADVILLE, SASKATCHEWAN, CANADA.

WINDOW ATTACHMENT.

1,276,641.     Specification of Letters Patent.     Patented Aug. 20, 1918.

Application filed February 24, 1917. Serial No. 150,774.

*To all whom it may concern:*

Be it known that I, JOSEPH M. GALLAGHER, a subject of the King of Great Britain, residing at Radville, in the Province of Saskatchewan and Dominion of Canada, have invented certain useful Improvements in Window Attachments, of which the following is a specification, reference being had therein to the accompanying drawing.

The invention relates to a window attachment, and more particularly to the class of emergency sight devices for use on locomotives or the like.

The primary object of the invention is the provision of a device of this character wherein an engineer or operator of a locomotive or the like will be assured of a clear view forwardly at all times so as to avoid the persons or live stock and to reduce head-on collisions and wrecks resultant from track defects or the like.

Another object of the invention is the provision of a device of this character wherein cinders or other flying particles will be prevented from entering the cab of the locomotive, and the engineer at any time will have a clear view notwithstanding the fact that the glass panes in the cab are frosted or covered with moisture resultant from climatic conditions, thereby assuring safety in the running of the locomotive.

A further object of the invention is the provision of a device of this character wherein the construction thereof is novel in form to constitute a sight device and which is readily and easily adjusted to the convenience of the user.

A still further object of the invention is the provision of a device of this character which is extremely simple in construction, reliable and efficient in its purpose, readily and easily applied in position, strong, durable and inexpensive in manufacture and installation.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a fragmentary elevation of a locomotive cab showing the device constructed in accordance with the invention applied;

Fig. 2 is a vertical longitudinal sectional elevation;

Fig. 3 is a sectional view on the line 3—3 of Fig. 1.

Similar reference characters indicate corresponding parts throughout the several views of the drawing.

Referring to the drawing in detail, A designates the front portion of the cab of a locomotive, which is of the ordinary well known construction, and B the window therein, as usual.

The glass pane C of the window B is cut to provide the desired size opening therein for receiving a panel 10 preferably made from wood, although it may be made from any other material desired, and is fastened in place in any suitable manner.

The panel 10 is formed with a medial elongated slot or opening 11 and outer slots 12, respectively, the latter being co-extensive with the intermediate slot 11, and working through these slots 12 are bolt members 13 which connect together inner and outer slides 14, the bolt members being provided with suitable wing nuts 15 for the tightening of the same so as to hold the slides, which move in unison, in their adjusted position. These slides are disposed at the outside and inside of the panel 10.

Adapted to be positioned within the slot or opening 11 is a sight tube 16 which is of the required length and is formed at its inner end with a peripheral bead or flange 17 which constitutes a stop for limiting the projecting of the tube 16 through the slot or opening 11 in the panel 10, and said tube is used by the engineer or operator of the locomotive to view forwardly of the path of travel of said locomotive. Carried by the tube 16 is a concavo-convex inner shield or guard 18 which is clamped to the said tube 16 through the medium of the screw members 19 which are engaged in the wings 20 at the point of bifurcation of said shield.

Formed in the lowermost point of the tube 16 is an opening 21 which forms an exit for cinders or other flying particles entering the outer end of the tube, and by reason of the disposition of the shield or guard 18 forwardly of the opening 21 the wind blast against the same will create a suction, thereby assuring the drawing of all cinders and other matter through the opening 21 so that the same will not enter the cab of the locomotive through the sight tube.

The tube 16 is fitted within slides 14 so that it will be raised therewith on adjustment of the same, the slides being preferably made from metal, although the same may be made from any other suitable material.

It will be obvious that in the use of the emergency sight attachment the engineer will have a clear view ahead in the direction of travel of the locomotive without regard to the condition of the window, that is to say, whether the same is frosted or covered with moisture, and in this manner avoid accidents and also assure the proper handling of the locomotive when in motion.

From the foregoing description, taken in connection with the accompanying drawing, the construction and manner of use of the herein described window attachment will be readily apparent and, therefore, a more extended explanation has been omitted.

Having thus described my invention, I claim:

In a device as described, in combination, a panel, a sighting tube, a slidable carriage upon said panel supporting said sighting tube adjustably on said panel, said sighting tube being formed between its ends with an opening in its bottom portion, said carriage adapted to close the panel against foreign matter entering, a frusto-conical shield having a split portion formed with opposing arcuate flanges, said shield having an opening through which said sighting tube projects, and fasteners engaging said flanges and adapted to clamp said flanges together so as to position the shield around said opening in a plane at right angles to the axis of said tube with the inner wall of said shield immediately in front of said opening.

In testimony whereof I affix my signature.

JOSEPH M. GALLAGHER.

Copies of this patent may be obtained for five cents each, by addressing the "Commissioner of Patents, Washington, D. C."